United States Patent
Gavade et al.

(10) Patent No.: US 9,049,264 B2
(45) Date of Patent: Jun. 2, 2015

(54) MEDIA START POSITION BASED ON INSERTING A START POSITION INDENTIFIER

(71) Applicant: Verizon Patent and Licensing Inc., Basking Ridge, NJ (US)

(72) Inventors: Sameer Gavade, Irving, TX (US); Venkata S. Adimatyam, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 251 days.

(21) Appl. No.: 13/724,680

(22) Filed: Dec. 21, 2012

(65) Prior Publication Data
US 2014/0181260 A1 Jun. 26, 2014

(51) Int. Cl.
*G06F 13/00* (2006.01)
*H04L 29/06* (2006.01)

(52) U.S. Cl.
CPC ........ *H04L 65/4084* (2013.01); *H04L 65/4092* (2013.01); *H04L 65/608* (2013.01)

(58) Field of Classification Search
CPC .............. H04L 29/08072; H04L 29/06; H04L 29/0809; H04L 29/08117; H04L 65/4084; H04L 65/4092; H04L 65/608; G06Q 30/02
USPC .................................................. 709/219, 231
See application file for complete search history.

(56) References Cited

U.S. PATENT DOCUMENTS

2012/0137015 A1* 5/2012 Sun ............................... 709/231

OTHER PUBLICATIONS

R. Pantos, Ed.: "HTTP Live Streaming: draft-pantos-http-live-streaming-10"; Apple Inc.; retrieved online http://tools.ietf.org/html/draft-pantos-http-live-streaming-10; Oct. 15, 2012; 37 pages.
"HTTP Live Streaming Overview"; Apple Developer; Apr. 1, 2011; 36 pages.
"HTTP Live Streaming"; Wikipedia; retrieved online http://en.wikipedia.org/w/index.php?title=HTTP_Live_Streaming&printable=yes; print date: Dec. 3, 2012; 8 pages.

* cited by examiner

*Primary Examiner* — Robert B Harrell

(57) ABSTRACT

A device may generate an index for providing media files via a HTTP Live media stream. The index may include an ordered list of uniform resource identifiers for obtaining the media files. The device may determine a start position for content corresponding to the media files and may insert a start point identifier into the index. The start point identifier may identify one of the uniform resource identifiers included in the ordered list of uniform resource identifiers, for obtaining one of media files that corresponds to the start position for the content. The device may send the index to a client device. The device may receive a request the one of the media files and may provide the one of the media files to the client device via the HTTP Live media stream.

20 Claims, 11 Drawing Sheets

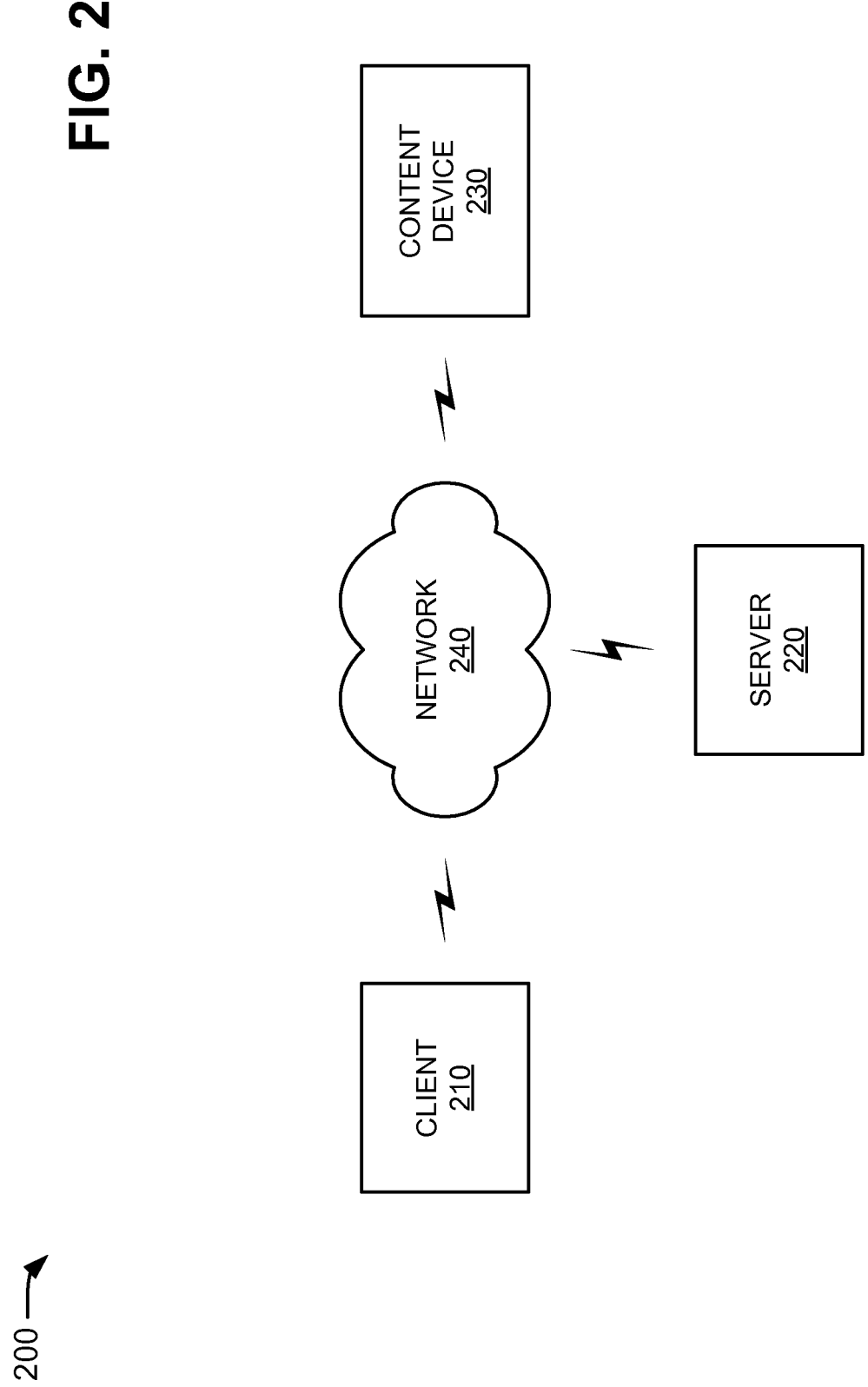

MEDIA START POSITION BASED ON INSERTING A START POSITION INDENTIFIER

BACKGROUND

HTTP Live Streaming is a protocol for transferring an unbounded stream of multimedia data (often called a "HTTP Live media stream"). To provide content via a HTTP Live media stream, a client device may first obtain an index for the HTTP Live media stream. The index includes an ordered listing of segmented media files and informational tags corresponding to the content. The client device uses the index to request the segmented media files. The client device requests the segmented media file listed first in the index and then continues, in order, down the list to provide the content.

BRIEF DESCRIPTION OF THE DRAWINGS

FIG. 2 is a diagram of an environment in which systems and/or methods, described herein, may be implemented;

DETAILED DESCRIPTION OF PREFERRED EMBODIMENTS

The following detailed description refers to the accompanying drawings. The same reference numbers in different drawings may identify the same or similar elements.

Systems and/or methods described herein may generate an index for a HTTP Live media stream that includes a start position identifier. The index may include a list of segmented media files corresponding to content to be streamed to a client device via a HTTP Live media stream. The start position identifier may indicate which of the segmented media files the client device is to obtain first and/or an order that the listed segmented media files are to be obtained.

Figure 1A:
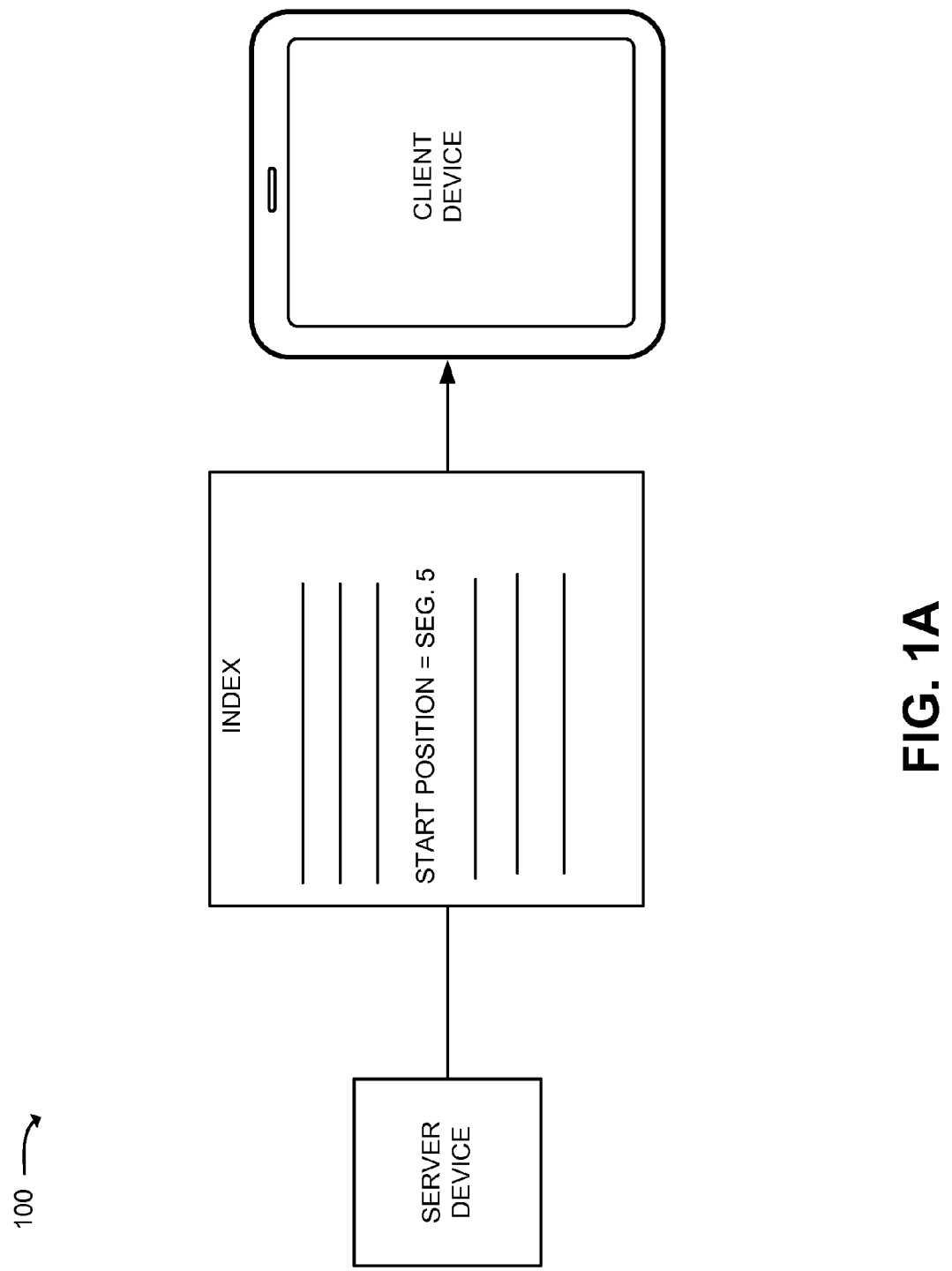
FIGS. 1A and 1B are diagrams illustrating an overview of implementations described herein.
Figure 1B:
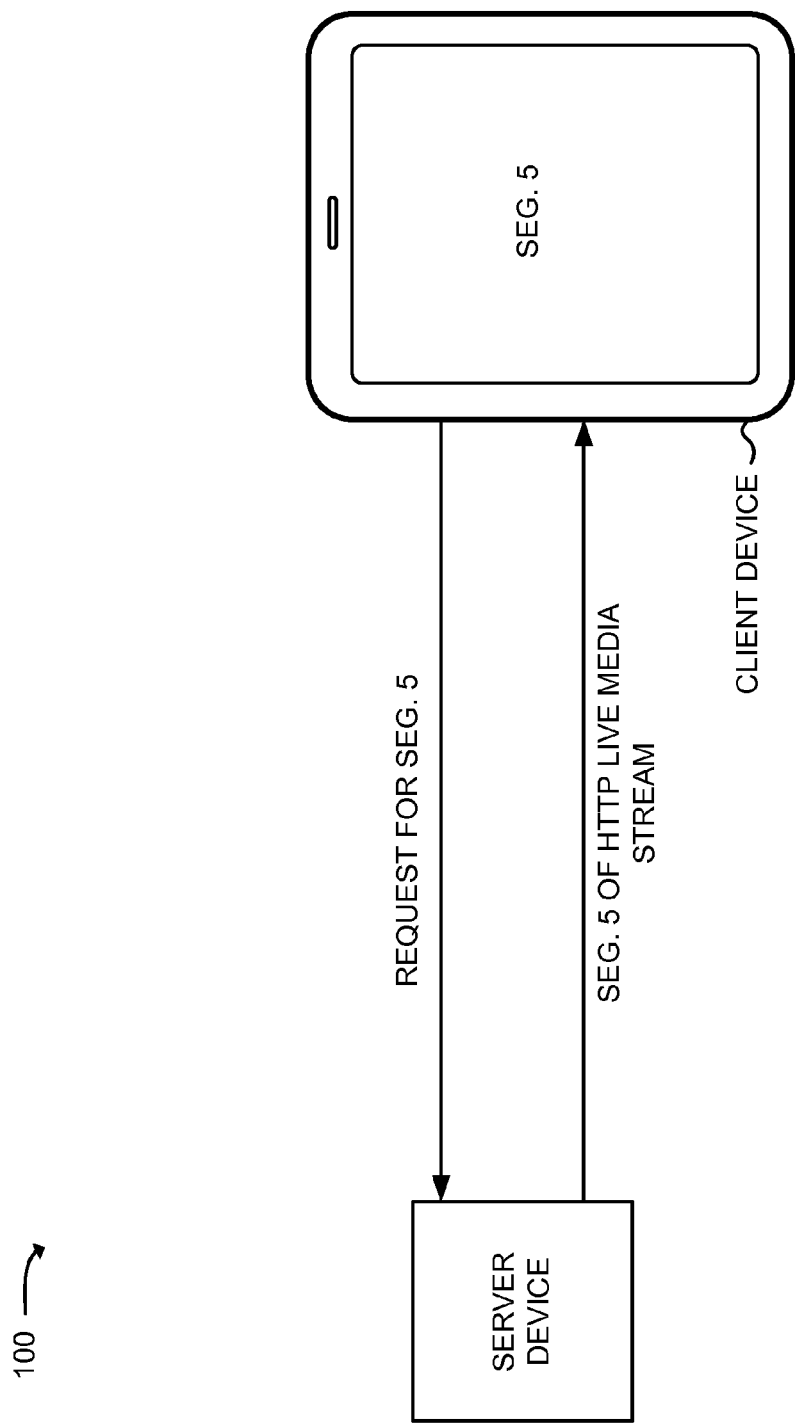

FIGS. 1A and 1B are diagrams illustrating an overview of implementations, as described herein. Referring to FIG. 1A, assume that a user desires to view streaming content (e.g., a particular video) on a client device. Further, assume that the client device requests an index corresponding to the video and that the request indicates that the HTTP Live media stream is to begin at a particular point or segment of the video (e.g., "Seg. 5").

A server device may generate an index for the HTTP Live media stream. The index may include a list of sequentially arranged media files and a start position identifier that includes information identifying a media start position for the video (e.g., "START POSITION=Seg. 5"). The server device may send the index to the client device. The client device may receive the index and may analyze the index to determine the start position identifier (e.g., the segmented media file to obtain first for providing the video to the user).

Based on analyzing the index, the client device may determine that the segmented media file, Seg. 5, is the first segmented media file to be obtained. As shown in FIG. 1B, the client device may send a request to the server to obtain the segmented media file, Seg. 5. In response to the request, the server may cause the segmented media file Seg. 5 to be provided to the client device via a HTTP Live media stream. The client device may receive the HTTP Live media stream and provide the video, beginning at Seg. 5 (e.g., the desired media start position).

FIG. 2 is a diagram of an environment 200 in which systems and/or methods described herein may be implemented. As shown in FIG. 2, environment 200 may include client device 210, server device 220, and content device 230 interconnected by network 240. Devices of environment 200 may interconnect via wired connections, wireless connections, or a combination of wired and wireless connections.

Client device 210 may include a device that is capable of communicating with a network (e.g., network 240) to receive content (e.g., objects, data, images, audio, video, text, etc.) via a HTTP Live media stream and provide the content to a user via a media stream (e.g., a stream of content that includes video content (e.g., a video stream), audio content (e.g., an audio stream), and/or textual content (e.g., a textual stream)). For example, client device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a personal computer, a laptop computer, a tablet computer, a camera, a personal gaming system, a television, a set top box, a digital video recorder (DVR), or another type of computation or communication device.

Server device 220 may include a server device, or other type of computation and communication device. In some implementations, server device 220 may communicate with client device 210 and/or content device 230 (e.g., via network 240) to enable client device 210 to obtain content stored by content device 230.

Content device 230 may include a device that obtains and/or stores content (e.g., objects, data, images, audio, video, text, etc.) and provides the content to one or more other devices (e.g., server device 220) via a data stream. For example, content device 230 may include a camera, a video recording device, a server, a data storage device, or other type of device for obtaining and/or providing content.

Network 240 may include one or more wired and/or wireless networks. For example, network 240 may include a cellular network, a public land mobile network ("PLMN"), a second generation ("2G") network, a third generation ("3G") network, a fourth generation ("4G") or LTE network, a fifth generation ("5G") network, other types of network such as a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Although FIG. 2 shows example components of environment 200, in other implementations, environment 200 may include fewer components, different components, differently arranged components, or additional components than those depicted in FIG. 2. In some implementations, one or more components of environment 200 may perform one or more tasks described as being performed by one or more other components of environment 200.

Figure 3:
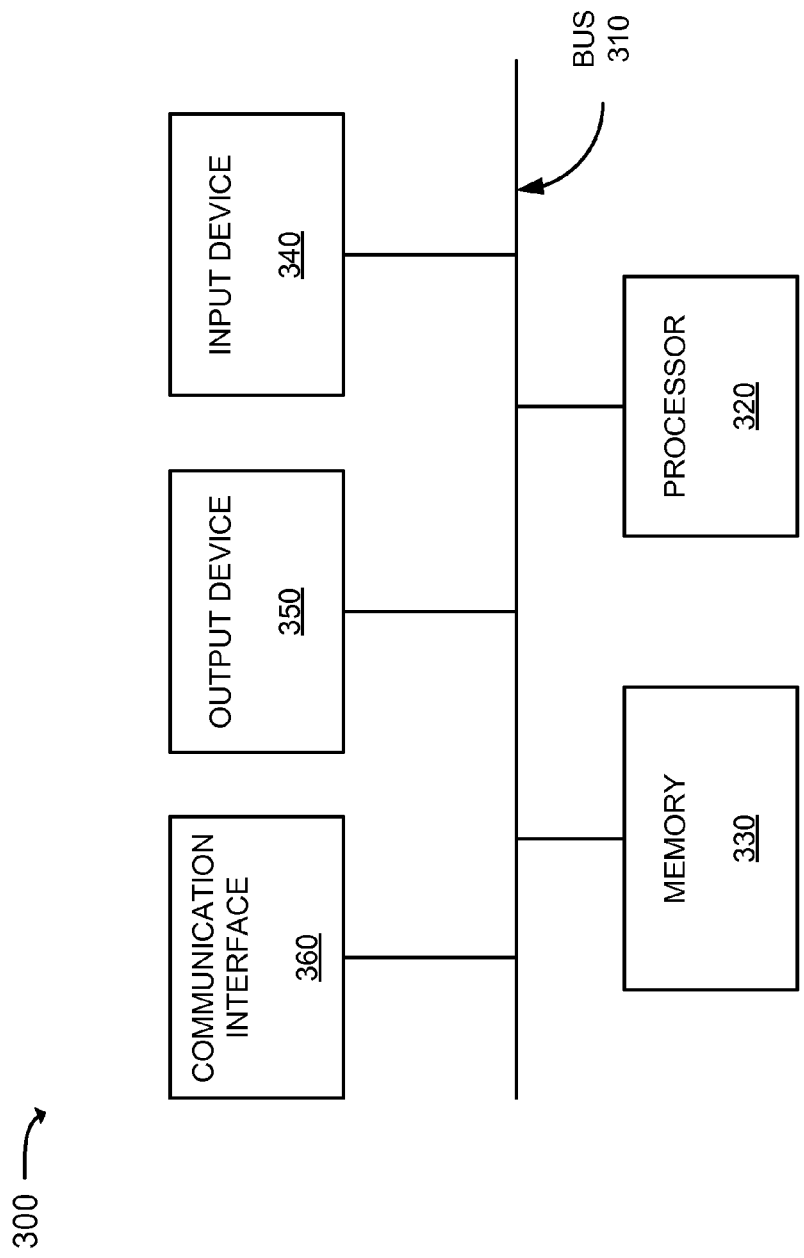
FIG. 3 illustrates example components of a device that may be used within the environment of FIG. 2 according to one or more implementations described herein.

FIG. 3 illustrates example components of a device 300 that may be used within environment 200. Device 300 may correspond to client device 210, server device 220, and/or content device 230. In some implementations, client device 210, server device 220, and/or content device 230 may include one or more devices 300 and/or one or more components of device 300.

As shown in FIG. 3, device 300 may include bus 310, processor 320, memory 330, input device 340, output device 350, and communication interface 360. Bus 310 may include a path that permits communication among the components of device 300. Processor 320 may include a processor, a microprocessor, an application specific integrated circuit (ASIC), a field programmable gate array (FPGA), or another type of processor that interprets and executes instructions. Memory 330 may include a random access memory (RAM) or another type of dynamic storage device that stores information or instructions for execution by processor 320, a read-only memory (ROM) or another type of static storage device that stores static information or instructions for processor 320, and/or a magnetic storage medium, such as a hard disk drive, or a removable memory, such as a flash memory.

Input device 340 may include a mechanism that permits an operator to input information to device 300, such as a control button, a keyboard, a keypad, a touch screen interface, a microphone, a camera, a video recorder, or another type of input device. Output device 350 may include a mechanism that outputs information to the operator, such as a light emitting diode (LED), a display, a speaker, or another type of output device. Communication interface 360 may include any transceiver-like mechanism that enables device 300 to communicate with other devices or networks. In one implementation, communication interface 360 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. In some implementations, one or more components of device 300 may perform one or more tasks described as being performed by one or more other components of device 300.

Figure 4:
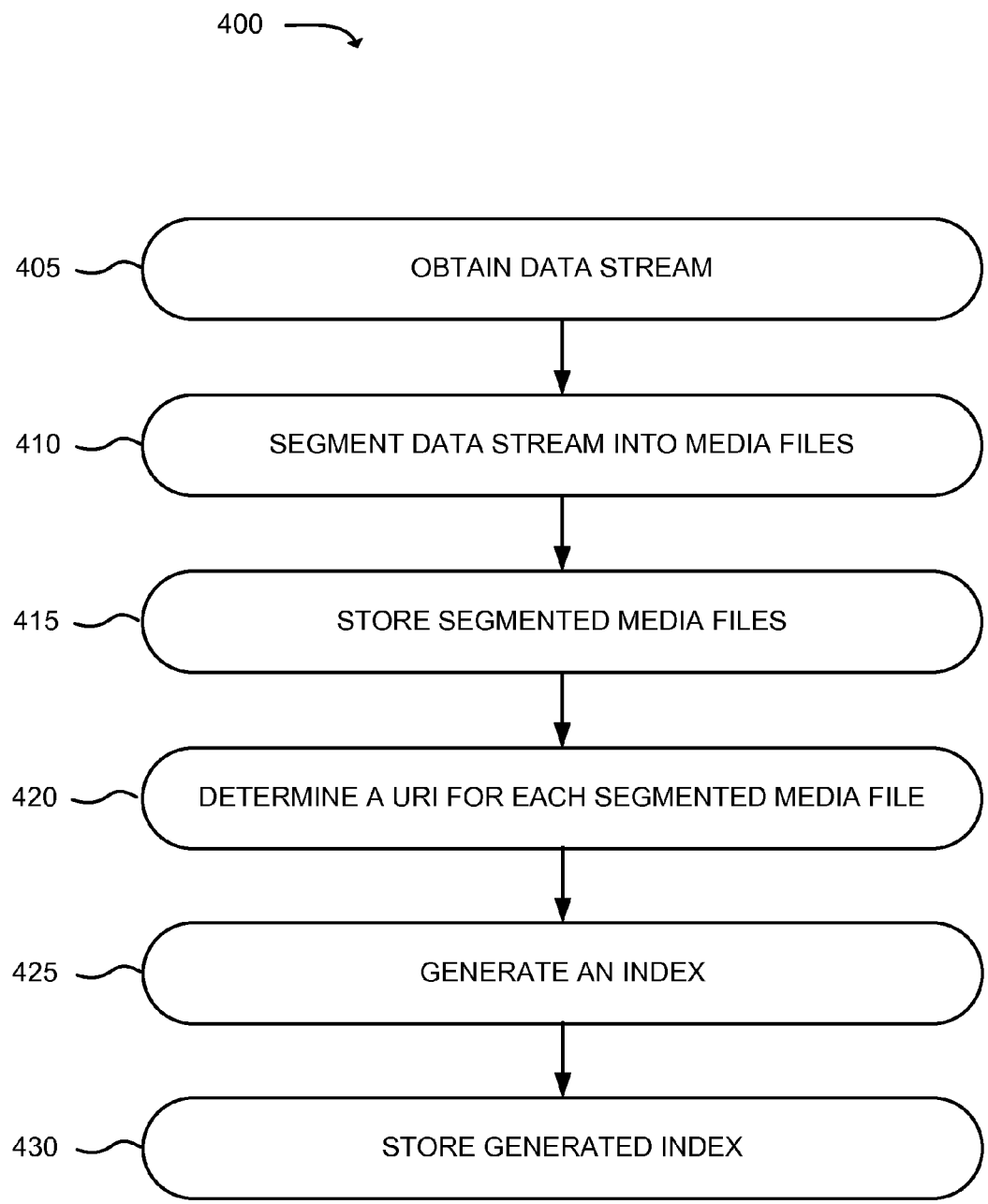
FIG. 4 is a flow chart of an example process for generating a HTTP Live Media stream.

FIG. 4 is a flow chart of an example process 400 for creating a HTTP Live media stream. In some implementations, process 400 may be performed by server device 220. In other implementations, one or more blocks of process 400 may be performed by one or more devices instead of, or possibly in conjunction with, server device 220.

As shown in FIG. 4, process 400 may include obtaining a data stream (block 405). For example, server device 220 may obtain a data stream. In some implementations, server device 220 may obtain the data stream from content device 230. In some implementations, server device 220 may obtain the data stream from a device other than content device 230 (e.g., another server device 220). In some implementations, the data stream may be a Moving Pictures Expert Group (MPEG)-2 data stream. In some implementations, the data stream may be another type of data stream.

In some implementations, server device 220 may obtain the data stream in response to receiving a request for content corresponding to the data stream. For example, server device 220 may receive a request from client device 210 and server device 220 may obtain the data stream in response to the request. In some implementations, server device 220 may periodically obtain data streams. In some implementations, server device 220 may obtain the data stream in conjunction with a service provided by content device 230 and/or server device 220. In some implementations, server device 220 may obtain data streams based on information received from content device 230. For example, server device 220 may obtain information from content device 230 regarding the availability of new and/or updated content. Server device 220 may obtain the data stream based on the new and/or updated content being available.

Process 400 may include segmenting the data stream into media files (block 410). For example, server device 220 may segment the data stream. In some implementations, server device 220 segment the data stream into a multiple individual media files. For example, server device 220 may determine a maximum duration for segmenting the data stream and may segment the data stream into multiple individual media files based on the determined maximum duration (e.g., each of the individual media files having a duration that is less than or equal to the maximum duration).

In some implementations, server device 220 may segment the data stream into multiple sets of individual media files. For example, server device 220 may generate multiple copies of the data stream and may generate a set of individual media files for each copy of the data stream. In some implementations, server device 220 may determine a maximum duration for each copy of the data stream and may generate a set of individual media files for each copy of the data stream based on the maximum duration determined for that copy of the data stream. In some implementations, server device 220 may determine the multiple maximum durations to accommodate different amounts of bandwidth that may be available for transmitting the media files via a HTTP Live media stream.

Process 400 may include storing the segmented media files (block 415). For example, server device 220 may store the segmented media files. In some implementations, server device 220 may store the segmented media files in a memory of server device 220. In some implementations, server device 220 may store the segmented media files in a memory of another device.

Process 400 may include determining a uniform resource identifier (URI) for each of the segmented media files (block 420). For example, server device 220 may determine a URI for each of the segmented media files. In some implementations, server device 220 may determine a URI based on a storage location of each segmented media file. For example, for each segmented media file, server device 220 may determine a URI that identifies a storage location of the segmented media file.

Process 400 may include generating an index (block 425). For example, server device 220 may generate an index for the segmented media files. In some implementations, server device 220 may generate an index that includes information for obtaining the segmented media files. For example, server device 220 may generate an index that lists a URI for obtaining each of the segmented media files. In some implementations, server device 220 may generate the index as an ordered list of URIs. The URIs may be listed in an order that corresponds to an order in which the segmented media files should be obtained (e.g., the segmented media file corresponding to the URI listed first in the index should be obtained first, the segmented media file listed second in the index should be obtained second, etc.).

In some implementations, server device 220 may generate the index as an Extended M3U Playlist (M3U) file. For example, server device 220 may generate an M3U file that identifies a URI determined for each of the segmented media files. In some implementations, server device 220 may generate an M3U file that includes an ordered list of the URIs. For example, server device 220 may generate an M3U file that includes an ordered list of lines that include information identifying a URI for obtaining one of the segmented media files.

In some implementations, server device 220 may generate multiple sets of segmented media files and may generate multiple indexes (e.g., an index for each set of segmented media files). Additionally or alternatively, server device 220 may generate a master index that includes URIs for obtaining the indexes generated for the sets of segmented media files.

Process 400 may include storing the index (block 430). For example, server device 220 may store the index. In some implementations, server device 220 may store the index with the corresponding set of segmented media files. In some implementations, server device 220 may store the index separate from the corresponding set of segmented media files.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5:
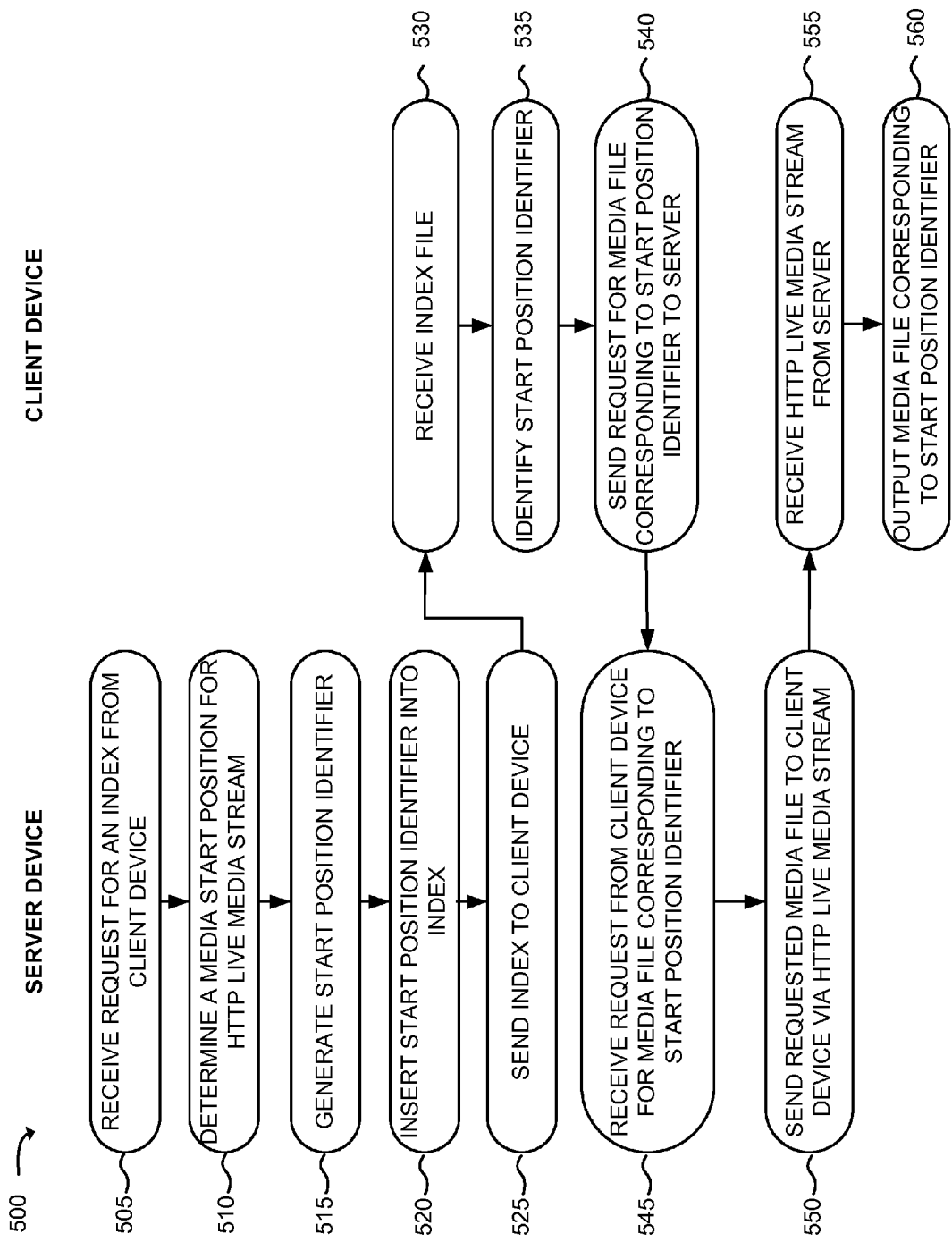
FIG. 5 is a flow chart of an example process for providing a HTTP Live Media stream based on a media start position.

FIG. 5 is a flow chart of an example process 500 for providing a HTTP Live media stream based on a media start position. In some implementations, process 500 may be performed by server device 220 and client device 210. In other implementations, one or more blocks of process 500 may be performed by one or more devices instead of, or possibly in conjunction with, server device 220 and/or client device 210.

As shown in FIG. 5, process 500 may include receiving a request for an index (block 505). For example, server device 220 may receive a request for an index. In some implementations, server device 220 may receive the request for the index from client device 210. For example, a user may select an application for watching a video on client device 210. In response to the selection, the application may send a request for an index to server device 220 to enable client device 210 to obtain the video via a HTTP Live media stream.

In some implementations, server device 220 may receive the request for the index from a device other than client device 210. For example, particular content may be provided to a user via a set top box. The user may desire to continue viewing particular content via client device 210. In response to input received from the user, the set top box may send server device 220 a request for transmitting an index corresponding to the particular content to client device 210.

Process 500 may include determining a media start position for the HTTP Live media stream (block 510). For example, server device 220 may determine a media start position for the HTTP Live media stream. In some implementations, the media start position may be the segmented media file that is to be the first segmented media file provided via the HTTP Live media stream. For example, server device 220 may determine that a user desires to have a requested content begin at a particular point (e.g., a particular segment, scene, etc.) and server device 220 may identify the segmented media file that corresponds to a start of the particular point in the content. In some implementations, the identified segmented media file will not correspond to a start of the requested content. In some implementations, the identified segmented media file will correspond to a start of the requested content.

In some implementations, server device 220 may determine that a user associated with client device 210 has previously viewed a portion of requested content. Server device 220 may determine the media start position as being the segmented media file that corresponds to a start of the remaining portion of the content (e.g., the portion of the requested content that has not been previously viewed by the user).

In some implementations, the request for the index may include information identifying the media start position. For example, the request for the index may include information indicating that the requested content should be provided beginning at a particular point (e.g., a particular segment, scene, runtime, etc.).

In some implementations, server device 220 may determine the media start position based on information associated with a user of client device 210. For example, a user may be viewing content via another client device (e.g., a TV, computer, etc.) and may wish to continue viewing the content via client device 210. Server device 220 may receive information indicating the last portion of the content that was provided to the user. Server device 220 may determine a segmented media files that corresponds to the next portion of the content to allow the user to continue viewing the content from the point at which the user stopped viewing the content on the other client device.

Process 500 may include generating a start position identifier (block 515). For example, server device 220 may generate a start position identifier. In some implementations, server device 220 may generate a start position identifier that identifies the media start position. For example, server device 220 may generate a start position identifier that indicates which of the segmented media file should be obtained first. In some implementations, the index may include a list of URIs for obtaining the segmented media files and the start position identifier may include information identifying the URI corresponding to the segmented media file that should be obtained first.

In some implementations, the start position identifier may include information (e.g., a particular character, a particular string of characters, a particular identifier, etc.) for identifying the start position identifier as the start position identifier. In some implementations, server device 220 may generate a specific type of start position identifier depending on a type of the index. For example, the index may be an M3U file and server device 220 may generate a tag line that includes a first alphanumeric string that identifies the line as a tag line and a second alphanumeric string that includes information identifying the media start position. As an example, the tag line may be #EXT-X-MEDIA-STARTPOS:4, where "#EXT-X-MEDIA-STARTPOS" corresponds to the first alphanumeric string and "4" corresponds to the information identifying the media start position.

In some implementations, server device 220 may generate a single index for a set of segmented media files and may generate a single start position identifier for the index. In some implementations, server device 220 may generate multiple indexes for multiple sets of segmented video files and may generate a start position identifier for each of the generated indexes.

Additionally or alternatively, the start position identifier may include information identifying an order that the segmented media files should be obtained in. For example, the index may include a list of URIs for obtaining the segmented media files. Each of the URIs may be associated with a sequence number and the start position identifier may include a listing of the sequence numbers. In some implementations, the listing of the sequence numbers may list the sequence number for each URI listed in the index. In some implementations, the listing of the sequence number may list only some of the sequence numbers.

Process 500 may include inserting a start position identifier into the index (block 520). For example, server device 220 may insert a start position identifier into an index. In some implementations, server device 220 may insert the start position identifier into the index at a predetermined location (e.g., a specific line or position in the index). In some implementations, server device 220 may insert the start position identifier into a particular portion of the index (e.g., a header portion).

In some implementations, server device 220 may determine where the start position identifier is to be inserted based on a type of the index. For example, server device 220 may determine that the index comprises a certain type of index (e.g., an M3U file) and may insert the start position identifier into a specific line of the M3U file (e.g., the fourth line of the M3U file). In some implementations, server device 220 may determine that the index is an M3U file and insert the start position identifier immediately following a tag line that includes information identifying the sequence number of the first URI listed in the index.

In some implementations, server device 220 may generate one index for multiple sets of segmented media files and may insert the start position identifier into the generated index. In some implementations, server device 220 may generate multiple indexes for multiple sets of segmented media files and may insert the start position identifier into each of the generated indexes.

Process 500 may include sending the index to client device 210 (block 525). For example, server device 220 may send the index to client device 210. In some implementations, server device 220 may send the index to client device 210 in response to receiving a request for the index. In some implementations, server device 220 may generate multiple indexes and send one or more of the multiple indexes to client device 210. For example, server device 220 may generate multiple indexes for multiple sets of segmented media files and may send one or more of the multiple indexes to client device 210. In some implementations, server device 220 may send a master index to client device 210. The master index may include a URI for obtaining one or more of the indexes generated for the multiple sets of segmented media files.

Process 500 may include receiving the index (block 530). For example, client device 210 may receive the index. In some implementations, client device 210 may receive the index from server device 220. In some implementations, client device 210 may receive a master index that includes URIs for obtaining one or more indexes generated for multiple sets of segmented media files. In some implementations, client device 210 may determine an amount of available bandwidth for receiving the HTTP Live media stream. Client device 210 may determine a maximum duration for the segmented media files based on the amount of available bandwidth. Client device 210 may determine that one of the URIs listed in the master index corresponds to a set of segmented media files with the determined maximum duration and may then use the URI to obtain the index for the set of segmented media files.

Process 500 may include identifying the start position identifier (block 535). For example, client device 210 may identify the start position identifier. In some implementations, client device 210 may parse the index to extract the start position identifier from the index. In some implementations, client device 210 may look for a particular character or string of characters included in the index to identify the start position identifier. For example, if #EXT-X-MEDIA-STARTPOS identifying a tag line that includes the start position identifier, client device 210 may parse the index to identify that particular tag line. In some implementations, client device 210 may look for the start position identifier at a particular location or in a particular portion of the index. For example, client device 210 may determine that the start position identifier is included in a particular line of the index (e.g., the fourth line of the index). In some implementations, client device 210 may identify the start position identifier based on a type of the index. For example, client device 210 may determine that the index is an M3U file and may identify the start position identifier as being included in the fourth line of the index based on the index being the M3U file.

In some implementations, client device 210 may obtain the start position identifier from a remote location. For example, client device 210 may obtain the start position identifier from server device 220 or some other device. In some implementations, client device 210 may determine a URI for obtaining the start position identifier and may obtain the start position identifier based on the URI. In some implementations, the URI may be included in the index. In some implementations, the URI may be transmitted to client device 210 separate from the index.

Process 500 may include sending a request for a media file corresponding to the start position identifier (block 540). For example, client device 210 may send a request for a media file corresponding to the start position identifier. In some implementations, client device 210 may send the request for the media file corresponding to the start position identifier to server device 220. In some implementations, the segmented media files may be stored on a device other than server device 220 (e.g., content device 230) and client device 210 may send the request for the media file to the other device.

Process 500 may include receiving the request for the media file corresponding to the start position identifier (block 545). In some implementations, server device 220 may receive the request for the media file corresponding to the start position identifier. For example, server device 220 may receive the request for the media file corresponding to the start position identifier from client device 210. In some implementations, the segmented media files may be stored on a device other than server device 220 (e.g., content device 230) and the other device may receive the request for the media file from client device 210.

Process 500 may include sending the requested media file via a HTTP Live media stream (block 550). In some implementations, server device 220 may send the requested media file via a HTTP Live media stream. For example, server device 220 may receive the request for the media file corresponding to the start position identifier from client device 210 and may send the requested media file to client device 210 via the HTTP Live media stream.

In some implementations, a device other than server device 220 may send the requested media file to client device 220. For example, when the requested media file is stored on a device other than server device 220 (e.g., content device 230), the other device may send the requested media file to client device 210 via the HTTP Live media stream.

Process 500 may include receiving the HTTP Live media stream (block 555). For example, client device 210 may receive the HTTP Live media stream. In some implementations, client device 210 may receive the HTTP Live media stream from server device 220. In some implementations, when the requested media file is stored on a device other than server device 220 (e.g., content device 230), client device 210 may receive the HTTP Live media stream from the other device.

Process 500 may include outputting the media file corresponding to the start position identifier (block 560). For example, client device 210 may output the media file corresponding to the start position identifier via a display and/or a speaker internal to (e.g., input 340) of client device 210. Additionally or alternatively, client device 210 may output the media file via a display and/or speaker external to client device 210.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
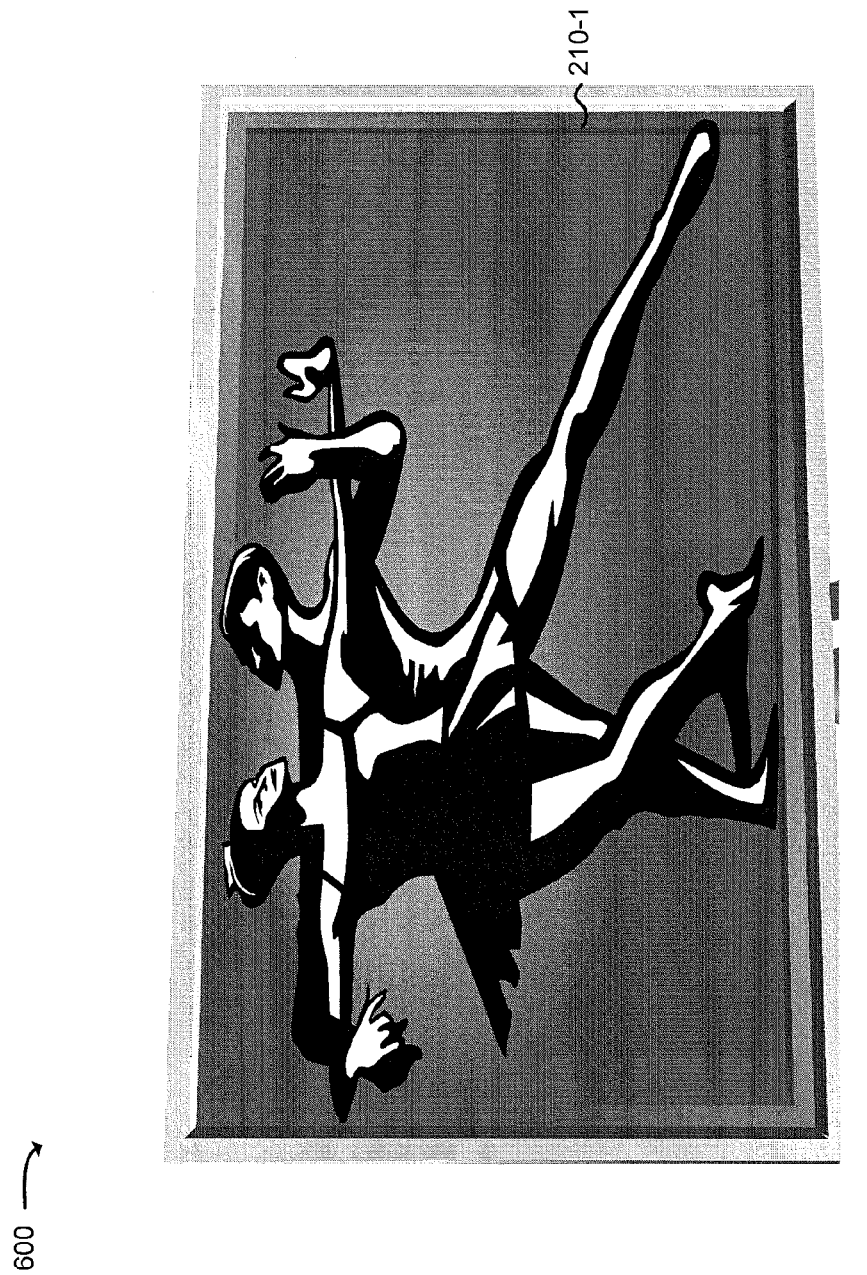
FIGS. 6A-6E are diagrams illustrating an example of the process described with respect to FIG. 5.
Figure 6B:
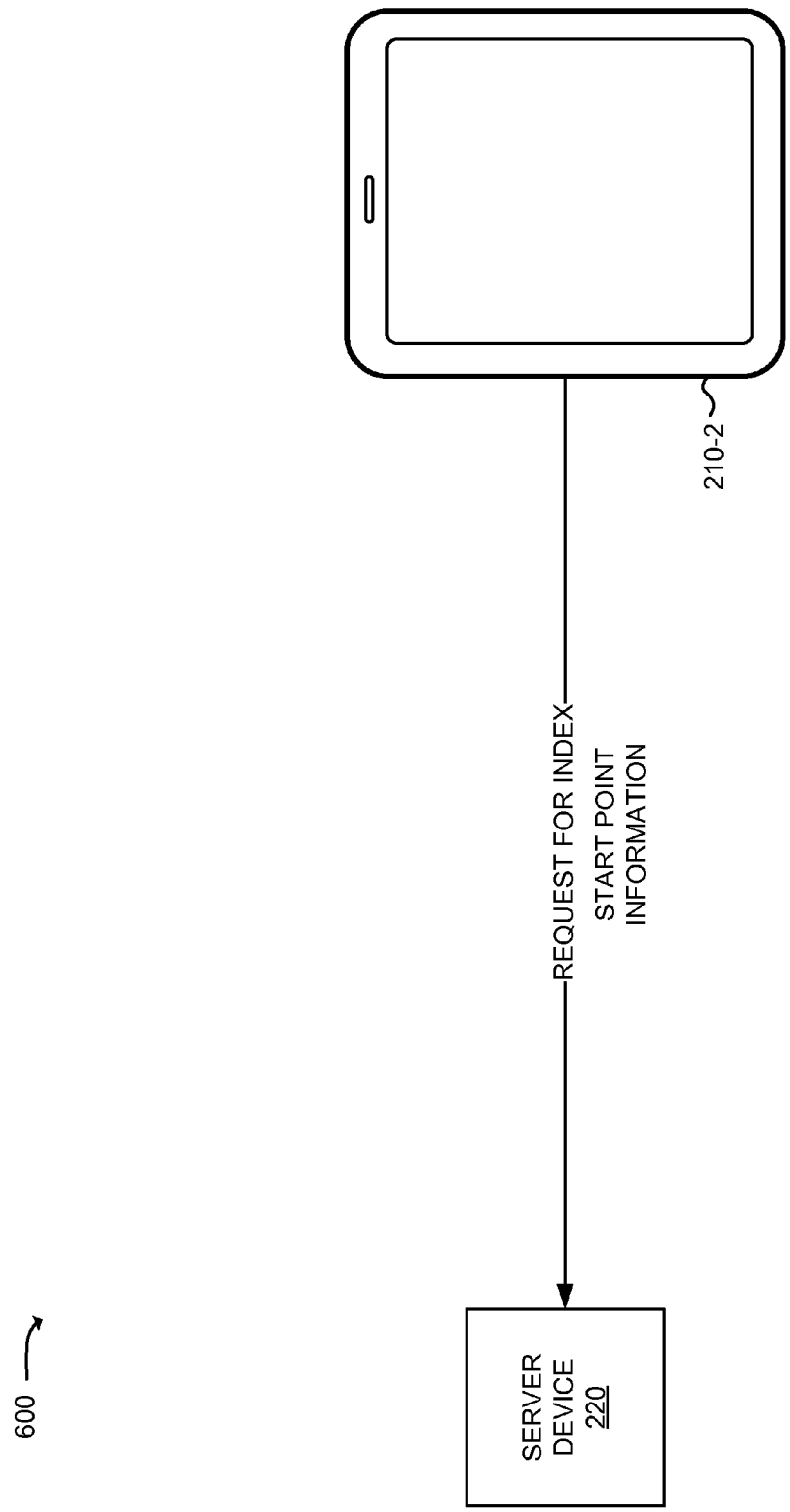

FIGS. 6A-6E are an example 600 of process 500 described above with respect to FIG. 5. With reference to FIG. 6A, assume that a user is viewing particular content on a first client device 210-1. Further, assume that the user desires to continue watching the particular content on a second client device 210-2. As shown in FIG. 6B, second client device 210 may send a request for an index corresponding to the particular content to server device 220. The request may include information identifying a start point for the particular content to allow the user to continue viewing the particular content beginning with the last portion of the particular content provided to the user via client device 210-1.

Figure 6C:
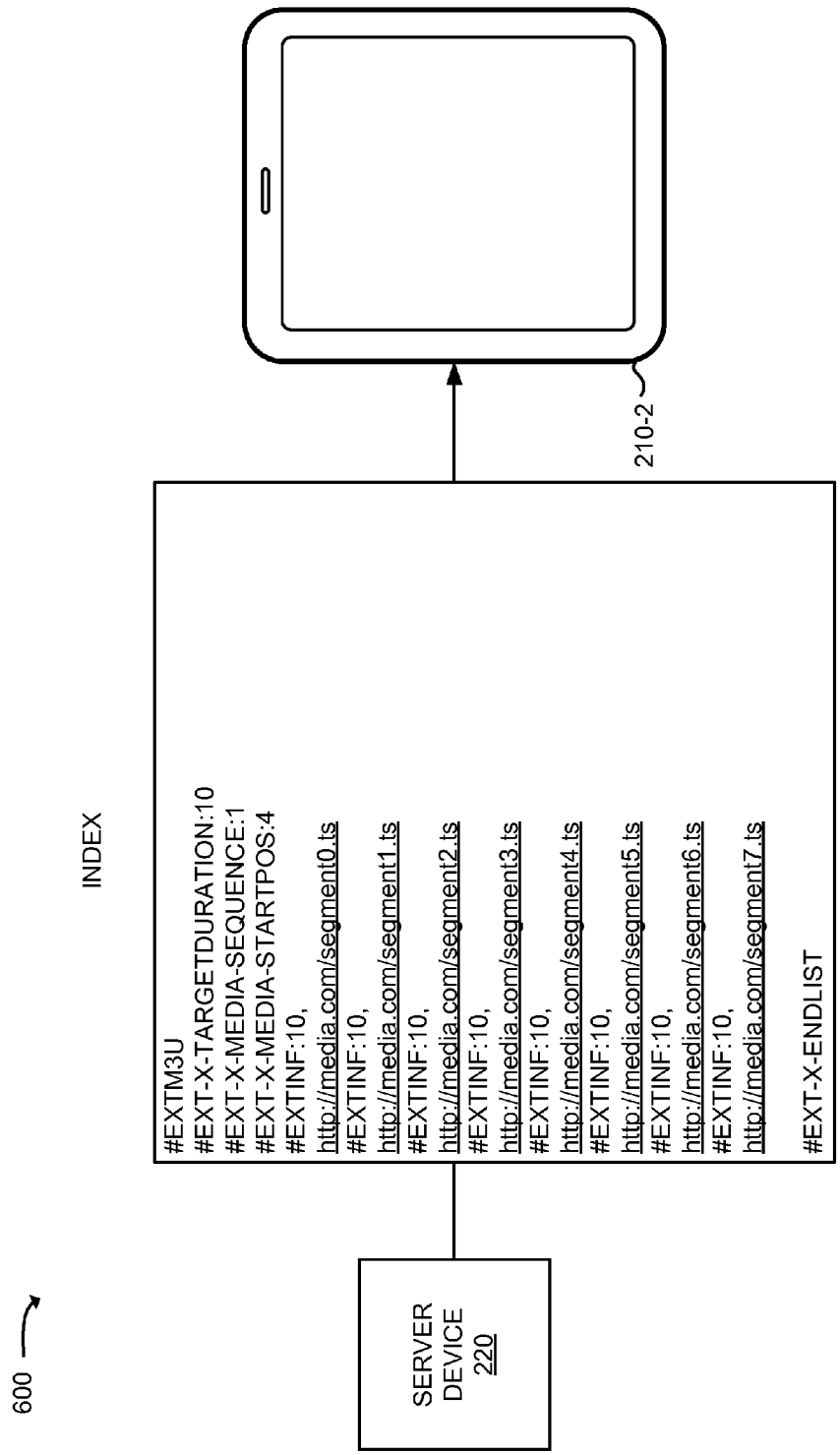

Server device 220 may receive the request from client device 210-2. Assume that in response to the request, server device 220 determines to provide the particular content via a HTTP Live media stream. With reference to FIG. 6C, server device 220 may provide an index for the particular content as an M3U file that includes an ordered list of URIs for the segmented media files that correspond to the particular content. Server device 220 may analyze the request to determine the start point for the particular content. Assume that server device 230 determines the start point as corresponding to the URI for the fourth media segment listed in the index (http://media.com/segment3.ts). Server device 220 may insert a start point identifier as a tag line into the index (#EXT-X-MEDIA-STARTPOS:4 as shown in FIG. 6C) and send the index to client device 210-2.

Client device 210-2 may receive the index. Client device 210-2 may analyze the index and determine that the index is an M3U file based on the first line of the index (#EXTM3U). Further, client device 210-2 may determine that the maximum duration of each of the listed segmented media files is 10 seconds (#EXT-X-TARGETDURATION:10), that the sequence number of the segmented media file listed first in the index is 1 (#EXT-X-MEDIA-SEQUENCE:1), that client device 210 should obtain the segmented media file corresponding to sequence number 4 first (#EXT-X-STARTPOS:4), that each of the segmented media files have a duration of 10 seconds (#EXTINF:10,), and that the index includes a complete listing of all the segmented media files for the particular content (#EXT-X-ENDLIST).

Figure 6D:
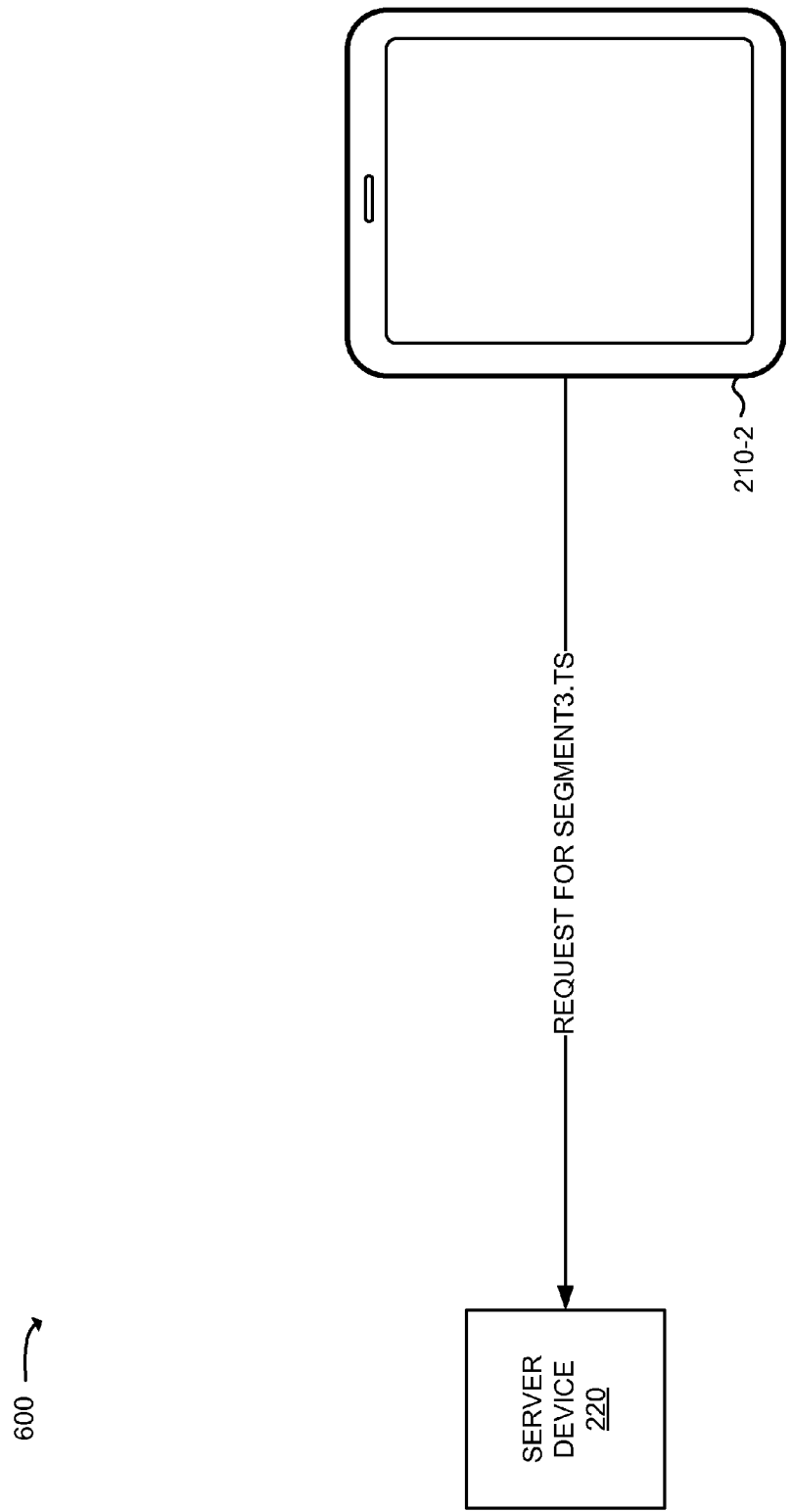

With reference to FIG. 6D, client device 210-2 may send a request to server device 220 for the segmented media file corresponding to sequence number 4 (segment3.ts) using the corresponding URI listed in the index (http://media.com/segment3.ts) based on the start position identifier (#EXT-X-STARTPOS:4) included in the index.

Figure 6E:
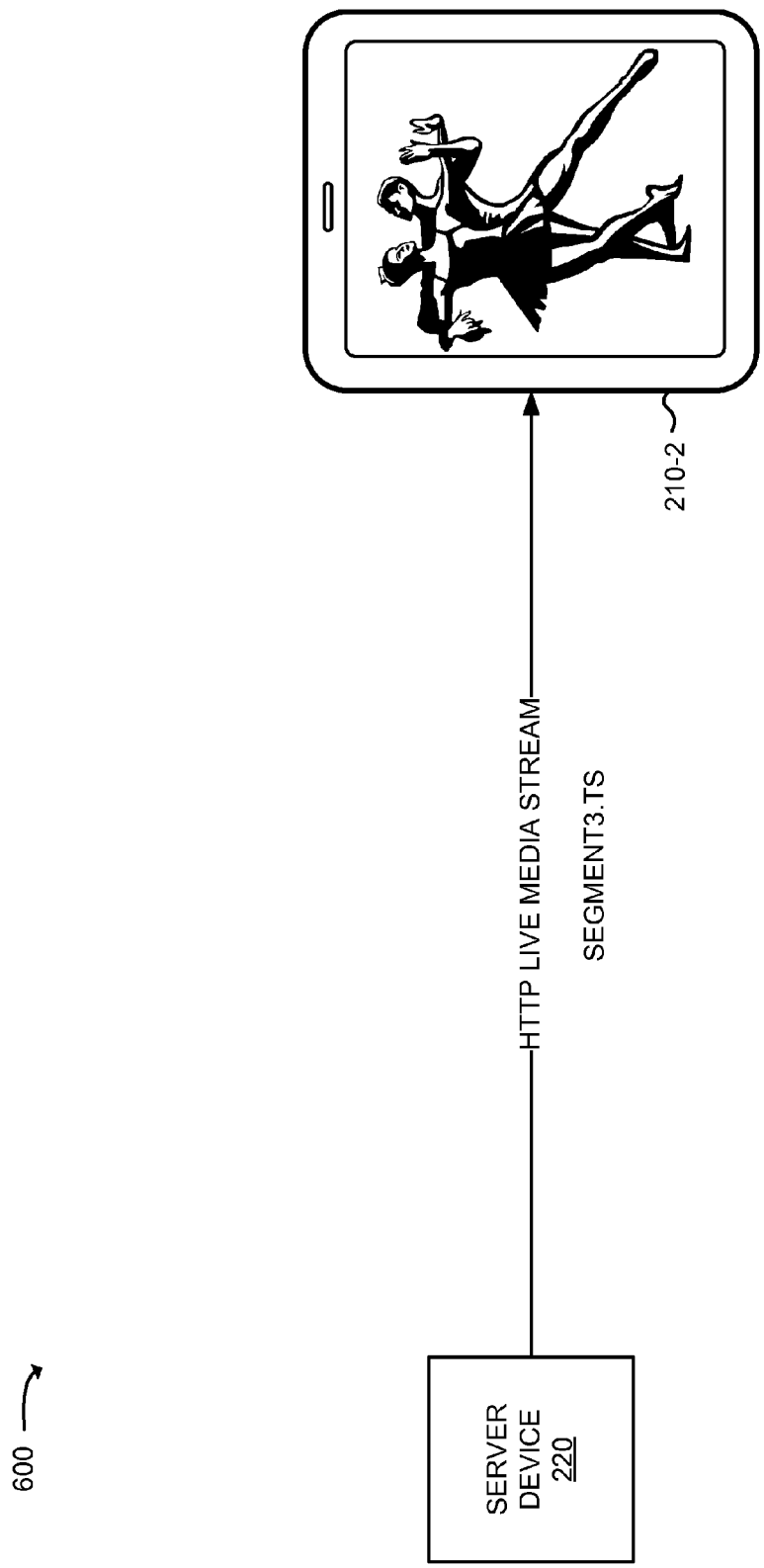

With reference to FIG. 6E, server device 220 may receive the request from client device 210-2 and may provide the requested segmented media file (segment3.ts) to client device 210-2 via a HTTP Live media stream. Client device 210-2 may receive the HTTP Live media stream and provide the particular content to the user beginning with segement3.ts to allow the user to continue viewing the particular content from the point at which the user stopped viewing the particular content via client device 210-1.

The foregoing description provides illustration and description, but is not intended to be exhaustive or to limit the embodiments to the precise form disclosed. Modifications and variations are possible in light of the above teachings or may be acquired from practice of the implementations. For example, while the above description focused on inserting a start point identifier into an index for a HTTP Live media stream, implementations, described herein, are equally applicable to inserting information identifying an order for obtaining the listed segmented media files additionally or alternatively to inserting the start point identifier into the index.

As used herein, the term device is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A hardware device comprising:
a processor to:
  generate an index associated with a plurality of media files;
    the index including an ordered list of uniform resource identifiers for obtaining the plurality of media files;

determine a start position for providing content corresponding to the plurality of media files via a HTTP Live media stream,
  where, when determining the start position, the processor is to:
    determine that a user associated with a client device has previously viewed a first portion of the content,
      the start position corresponding to a start of a second portion of the content that has not been provided via the HTTP Live media stream;
  determine that one of the plurality of media files corresponds to the start position;
  insert a start position identifier that identifies one of the uniform resource identifiers, for obtaining the one of the plurality of media files, into the index; and
  provide the index, including the start position identifier, to the client device.

2. The hardware device of claim 1, where the client device comprises a first client device, and
  where the processor is further to:
    provide a first portion of the content to a second client device that is different from the first client device; and
    receive a request to provide a second portion of the content to the first client device via the HTTP Live media stream.

3. The hardware device of claim 2, where, when determining the start position, the processor is further to:
  determine that the one of the plurality of media files corresponds to a start of the second portion of the content; and
  determine the start position based on the one of the plurality of media files corresponding to the start of the second portion of the content.

4. The hardware device of claim 1, where the processor is further to:
  determine an order for providing the plurality of media files,
  where the start position identifier further identifies the order for obtaining at least a second one of the plurality of media files.

5. The hardware device of claim 1, where
  when generating the index, the processor is further to:
    generate an extended M3U playlist file, and
  when inserting the start position identifier, the processor is further to:
    generate a tag line that identifies the one of the plurality of uniform resource identifiers; and
    insert the tag line into the index.

6. The hardware device of claim 1, where, when inserting the start position identifier, the processor is further to:
  insert the start position identifier into a particular position of the index.

7. The hardware device of claim 1, where, when inserting the start position identifier, the processor is further to:
  insert an identifier for identifying the start position identifier into the index.

8. The hardware device of claim 1, where another one of the uniform resource identifiers is listed prior to the one of the uniform resource identifiers in the ordered list of uniform resource identifiers.

9. A method comprising:
  generating, by a hardware device, an index for providing a plurality of media files via a HTTP Live media stream, the index including an ordered list of uniform resource identifiers for obtaining the plurality of media files;
  determining, by the hardware device, a start position for content corresponding to the plurality of media files,
    determining the start position for the content including:
      determining the start position for the content based on a first portion of the content having been previously provided to a client device via the HTTP Live media stream;
  inserting, by the hardware device, a start point identifier into the index,
    the start point identifier identifying one of the uniform resource identifiers, included in the ordered list of uniform resource identifiers, for obtaining one of the plurality of media files, and
    the one of the plurality of media files corresponding to the start position for the content;
  sending, by the hardware device, the index to the client device;
  receiving, by the hardware device and based on sending the index, a request for the one of the plurality of media files; and
  providing, by the hardware device, the one of the plurality of media files to the client device via the HTTP Live media stream.

10. The method of claim 9, where inserting the start position identifier includes:
  inserting information identifying a uniform resource identifier for obtaining the start position identifier into the index.

11. The method of claim 9, where
  generating the index includes:
    generating an extended M3U playlist file, and
  where inserting the start point identifier includes:
    inserting a tag line that identifies a sequence number of the one of the uniform resource identifiers into the index.

12. The method of claim 9, where at least one other uniform resource identifier, of the uniform resource identifiers, is listed prior to the one of the uniform resource identifiers in the ordered list of uniform resource identifiers.

13. The method of claim 9, where the client device comprises a first client device, and
  where determining the start position for the content includes:
    receiving, from a second client device, information indicating that a portion of the content was previously provided to the second client device,
      the second client device being different from the first client device; and
    determining the start position based on the received information.

14. The method of claim 9, where inserting the start position identifier includes:
  inserting the start position identifier into a particular location of the index.

15. A hardware computer-readable medium storing instructions, the instructions comprising:
  one or more instructions that, when executed by a processor, cause the processor to:
    receive an index associated with obtaining content via a HTTP Live media stream,
      the index including an ordered list of uniform resource identifiers for obtaining a plurality of segmented media files corresponding to the content, and
      the index further including a start position identifier that indicates a first segmented media file, of the plurality of segmented media files, the start position identifier being based on a particular segmented media file, of the plurality of media files, having been previously received via the HTTP Live media stream;

obtain the start position identifier from the index;

determine a first uniform resource identifier, of the ordered list of uniformed resource identifiers, corresponding to the first segmented media file based on the start position identifier;

request the first segmented media file based on the first uniform resource identifier;

receive the first segmented media file via the HTTP Live media stream; and output the first segmented media file.

16. The hardware computer-readable medium of claim 15, where a second uniform resource identifier, of the ordered list of uniform resource identifiers, is listed prior to the first uniform resource identifier.

17. The hardware computer-readable medium of claim 15, where the one or more instructions to obtain the start position identifier include:

one or more instructions to identify a particular portion of the index; and one or more instructions to obtain the start position identifier from the particular portion of the index.

18. The hardware computer-readable medium of claim 15, where the one or more instructions to obtain the start position identifier include:

one or more instructions to identify a particular line of the index; and one or more instructions to obtain the start position identifier from the particular line of the index.

19. The hardware computer-readable medium of claim 15, where the one or more instructions to obtain the start position identifier include:

one or more instructions to parse the index to extract the start position identifier.

20. The hardware computer-readable medium of claim 15, where the one or more instructions to obtain the start position identifier include:

one or more instructions to identify a uniform resource identifier for obtaining the start position identifier, the uniform resource identifier for obtaining the start position identifier being included the index; and one or more instructions to obtain the start position identifier based on the uniform resource identifier for obtaining the start position identifier.

\* \* \* \* \*